United States Patent [19]
Kuga

[11] Patent Number: 5,832,338
[45] Date of Patent: Nov. 3, 1998

[54] IMAGE FORMING APPARATUS

[75] Inventor: Masato Kuga, Kawasaki, Japan

[73] Assignee: Kabushiki Kaisha Toshiba, Kawasaki, Japan

[21] Appl. No.: 977,623

[22] Filed: Nov. 25, 1997

[51] Int. Cl.⁶ .................................................. G03G 21/14
[52] U.S. Cl. .................................. 399/82; 399/9; 358/296
[58] Field of Search ................................. 399/83, 82, 81, 399/38, 75, 9; 358/296, 300

[56] References Cited

U.S. PATENT DOCUMENTS

| | | |
|---|---|---|
| 5,045,880 | 9/1991 | Evanitsky et al. . |
| 5,481,335 | 1/1996 | Furuichi et al. ...................... 399/83 X |
| 5,491,557 | 2/1996 | Nakajima et al. ....................... 358/296 |
| 5,608,493 | 3/1997 | Tanaka et al. ............................. 399/83 |
| 5,680,221 | 10/1997 | Takano ................................... 399/83 X |

*Primary Examiner*—R. L. Moses
*Attorney, Agent, or Firm*—Foley & Lardner

[57] ABSTRACT

When any one of keys other than a start key on an operation panel is depressed after a printing operation according to a background job starts in a ready state, a system CPU for controlling all the parts of the machine sets a condition flag indicative of the start of a front job. By virtue of the flag, the CPU determines the front job is being executed, and even if any trouble occurs in the background job, the CPU instructs a message indicator to display the trouble occurrence message for only a predetermined short period of time, and then lets the front job operation continue. The CPU controls the message indicator to display the message of the occurrence of the trouble in the background job again when the front job operation has finished.

14 Claims, 14 Drawing Sheets

IMAGE FORMING APPARATUS

BACKGROUND OF THE INVENTION

The present invention relates to an image forming apparatus such as a digital copying machine having copying function, scanning function, printing function, facsimile data transmission/reception function image processing function, and image transmission function.

Conventionally, reading means (a scanner) and image-forming means (a printer) of an image-forming apparatus such as a digital copying machine can be operated independently.

A digital copying machine has various functions and a structure for realizing the operations by the functions: reading the document by optical means; converting the read image data into an electric signal to variously process it; storing the image data in a memory to process the data in the memory; and image-forming (printing) the image data again with use of a laser electric photographic processor (i.e., a laser engine), A digital copying machine has the above-mentioned functions and structure, and thus has not only the copying function as provided to the analog copying machine but also the facsimile data transmission/reception function and printing function, with use of only one laser engine. According to the facsimile data transmission/reception function, image data is transmitted through a telephone line and the received image data is printed. According to the printing function, a digital copying machine can receive printed data and print the received data using image transmitting means which enables the copying machine to communicate with a host computer.

In other words, one common laser engine enables one machine (a digital copying machine) to realize various functions such as image-data transmission and received image data printing. Further, in a digital copying machine, image data reading section and laser engine section do not need to be synchronizedly operated, unlike the conventional analog copying machine, and thus the digital copying machine can attain "parallel operations": the image data read by the image data reading section is converted into an electric signal so as to be transmitted through a telephone line, and the data transmitted from a host computer to be printed is printed by the laser engine simultaneously with the transmission operation. In this time, the operations of image reading, image data transmission by a facsimile, and image data printing are processed as if these jobs are independently required.

In this manner, the conventional digital copying machine has a great advantage that the jobs related to different resources, i.e., the printing of the image data received by the facsimile, or the print data printing, can be simultaneously executed using one engine. The conventional digital copying machine, however, has a critical drawback in which one laser engine is used in common to these jobs, and thus when a problem occurs in a job, the other jobs which are requested to be executed can not be executed till the job is canceled.

Particularly, when a trouble such as the paper jam, no paper box, or empty toner cartridge occurs while the user operates the digital copying machine to execute job requests for attaining the parallel operation, the machine operation itself may be obliged to stop (cancel) due to the trouble. In this time, the stopped or canceled operation is inhibited from being executed till the trouble is overcome. There are little possibilities that the trouble itself is caused by the job requested by the user who operates the machine in that time.

The user may be convinced that the other job cannot be executed due to the trouble since one laser engine is used in common. However, the user has to stop (or cancel) the operation which the user is executing in that time or requested to be executed, because of the trouble caused by the job which the other user has set or requested to execute. In addition, the user is actually required to overcome the trouble caused by the job which the user has not set or requested. The user may thus feel these operations unbearably uncomfortable.

In the conventional digital copying machine, the following parallel operation can be attained:

(1) During the reception of the print data as a background job, the image data transmission via a facsimile as a front job is executed;

(2) while the received image data is being printed (background job), the image data is transmitted by a facsimile (front job);

(3) while the received facsimile document data is being printed (background job), the image data is transmitted by a facsimile (front job);

(4) while the image data is transmitted by a facsimile (background job), copying operation is executed (front job);

(5) while the image data is transmitted by a facsimile (front job), the printing of the print data is started (background job);

(6) while the image data is transmitted by a facsimile is executed (front job), the printing of the received facsimile document data is started (background job);

(7) while the image data is transmitted by a facsimile is executed (front job), the printing of the received facsimile document data is started (background job); and (8) while the copying operation is being executed (front job), the reception of the facsimile document data is started (background job).

With the conventional digital copying machine, however, the user is inhibited from performing the operation itself at a time when some obstruct occurs.

It may be acceptable for the user that the job requested to be executed in that time cannot be executed till the trouble is overcome. The stop of the operation, however, will actually lessen the operability. Even if the operation is not stopped, the message indicative of the occurrence of the trouble is continuously displayed, and thus the other necessary message cannot be displayed, with the result that the operability will be lessened also in this case.

BRIEF SUMMARY OF THE INVENTION

The object of the present invention is to provide an image forming apparatus capable of preventing the operability from being lessened even if a trouble due to a job being executed occurs while a new other job is being requested to be executed, thereby improving the operation efficiency.

According to a first aspect of the invention, this object is attained by the apparatus comprising means for receiving image data; means for storing image data received by the receiving means; means for forming image on an image-forming medium on the basis of the image data stored in the storing means; means for setting a second job while the image-forming means is performing an operation of a first job; means for displaying a trouble occurrence message when a trouble occurs in the first job operation; first control means for controlling the display means to delete the trouble occurrence message after a lapse of a predetermined period of time unless the setting means has set the second job when the display means display the trouble occurrence message; and second control means for controlling the display means to display the trouble occurrence message again when the setting means has set the second job.

According to a second aspect of the invention, the object of the present invention is attained by the apparatus comprising means for receiving image data; first memory means for storing image data received by the receiving means; means for forming image on an image-forming medium on the basis of the image data stored in the memory means; means for setting a second job while the image-forming means is performing an operation of a first job; means for controlling the setting means to continue the setting of the second job until the setting means completes the setting operation for the second job when a trouble occurs in the first job operation; second memory means for storing the second job when the setting of the second job which is continued by the setting means has completed; and means for displaying a trouble occurrence message representing that the trouble occurs in the first job operation by the image-forming means when the second job is stored in the second memory means.

According to a third aspect of the invention, the object of the present invention is attained by the apparatus comprising means for receiving image data; means for storing image data received by the receiving means; means for forming image on an image-forming medium on the basis of the image data stored in the storing means; means for setting a second job while the image-forming means is performing an operation of a first job; means for controlling the setting means to continue the setting of the second job until the setting means completes the setting operation for the second job when a trouble occurs in the first job operation; and means for displaying a trouble occurrence message representing that the trouble occurs in the first job operation by the image-forming means when the second job setting has completed by the setting means.

According to a fourth aspect of the invention, the object of the present invention is attained by the apparatus comprising means for receiving image data; means for storing image data received by the receiving means; means for forming image on an image-forming medium on the basis of the image data stored in the storing means; means for setting a second job while the image-forming means is performing an operation of a first job; means for displaying a contents of a job set by the setting means and development of the first job by the image-forming means; means, when a trouble occurs in the first job by the image-forming means during the setting of the second job by the setting means, for selecting either of continuing and stopping of the setting of the second job, in accordance with a kind of the trouble; first control means, when the selecting means selects the continuing of the setting of the second job, for controlling the display means to display a trouble occurrence message representing that the trouble occurs in the first job operation by the image-forming means, and for controlling the setting means to continue the setting of the second job; and second control means for controlling the display means to display the trouble occurrence message again when the setting means has set the second job.

According to a fifth aspect of the invention, the object of the present invention is attained by the apparatus comprising means for receiving image data; means for storing image data received by the receiving means; means for forming image on an image-forming medium on the basis of the image data stored in the storing means; means for setting a front job while the image-forming means is executing an operation of a background job; means for displaying a trouble occurrence message when a trouble occurs in the background job operation; first control means for controlling the display means to display the trouble occurrence message for a predetermined period of time until the setting means completes the setting operation for the front job when the display means display the trouble occurrence message; and second control means for controlling the display means to display the trouble occurrence again when the setting means has set the front job.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described, with reference to the accompanying drawings.

Figure 1:
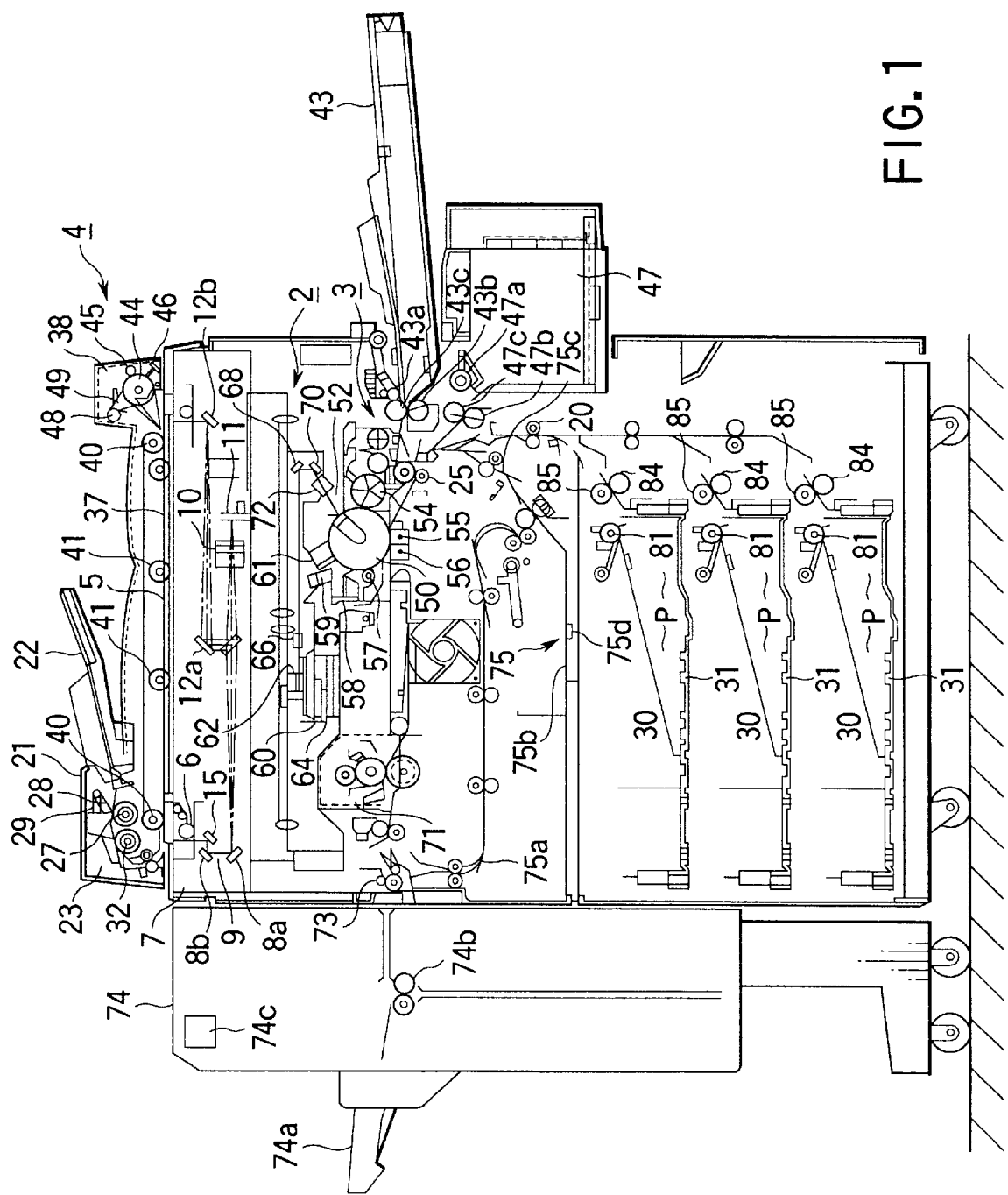
FIG. 1 is a sectional view of a digital copying machine as an image forming apparatus according to the present invention.

FIG. 1 schematically shows a digital copying machine 1, or an image forming apparatus according to the present invention. As shown in FIG. 1, the digital copying machine 1 comprises a scanner 2, a printer 3 (a laser engine) and an automatic document feeder (ADF) 4.

The digital copying machine 1 further comprises a housing which contains the scanner 2 and the printer 3. The top of the housing is used as a document table 5. The automatic document feeder 4 comprises a cover 21, a document tray 22, a document-feeding section 23, and a document-discharging section 38. The cover 21 is fastened at its right edge to the upper-right edge of the housing by a hinge device (not shown). The feeder 4 can therefore be rotated between a first position and a second position, where it covers and opens the document table 5, respectively.

The tray 22 is connected to the cover 21 and inclined a little upwards. The document-feeding section 23 is provided in the left part of the cover 21. The section 23 is designed to feed document sheets, one by one, onto the document table 5. The document-feeding section 23 comprises a pickup roller 27, a weight plate 28, an empty sensor 29, and a document-feeding roller 32. The pickup roller 27 is provided for pulling a document sheet from the document tray 22 into the cover 21, the plate 28 for pressing the document sheet onto the pickup roller 27, and the sensor 29 for detecting the presence or absence of a document sheet on the document table 22. The document-feeding roller 32 is located on the exit side of the pickup roller 27 a document-feeding roller 32, for feeding document sheets, one by one, from the pickup roller 27.

The automatic document feeder 4 further comprises an endless belt 37, a pair of belt rollers 40, a plurality of rollers 41 and a set switch (not shown). The endless belt 37 is wrapped around the bet rollers 40 and extends horizontally, covering the document table 5. The belt 37 is white and can be driven in both the forward direction and the reverse direction. The rollers 41 contact the inner surface of the lower half of the endless belt 37, pressing the lower half of the belt 37 onto the document table 5. The set switch is provided to detect whether the automatic document feeder 4 covers or opens the document table 5. When driven in the forward direction, the endless belt 37 feeds a document sheet supplied from the left edge of the document table 5 to the right edge thereof.

The document-discharging section 38 is located in the right end part of the cover 21. The section 38 comprises a feeding roller 44, a pinch roller 45, a discharge sensor 46, a discharge sensor 46, a discharge roller 48 and a gate 49. The pinch roller 45 presses the a document sheet onto the feeding roller 44. The sensor 46 detects the read edge of a document sheet being discharged from the automatic document feeder 4. The discharge roller 48 is located at the exit of a document-discharging path. The gate 49 is provided in the document-discharging path, for guiding a document sheet, turned up-side down, to the document table 5, so that data can be read from the reverse side of the document sheet and copied on a paper sheet.

The scanner 2 which functions as data-reading means comprises a first carriage 7, a second carriage 9, a lens 10, a CCD sensor 11 and an A/D converter (not shown). The first carriage 7 holds an exposure lamp 6 and a mirror 15. The second carriage 17 hods two mirrors 8a and 8b for bending a light beam path. The lens 10 receives from the mirror 8b and focuses it on the CCD sensor 11. The CCD sensor 11 generates analog image data from the light beam. The A/D converter converts the analog image data to digital image data.

The first carriage 7 and the second carriage 9 are connected by a timing belt (not shown). The second carriage 9 is moved in the same direction as the first carriage 7 at half the speed thereof. The length of the optical path extending from the mirror 25 to the lens 10 therefore remains unchanged while the scanner 2 is scanning the document sheet placed on the document table 5. The lens 10 has a fixed focal distance and is moved in its optical axis to enlarge or reduce the image recorded on the document sheet. The CCD sensor 11 comprises a plurality of photoelectric elements arranged in rows and columns, each of which generates one analog pixel data item. The analog pixel data items generated by the CCD sensor 11 are supplied to the A/D converter.

The first carriage 7 and the second carriage 9 (hence, the mirrors 12a and 12b) are driven by two stepping motors (not shown), respectively. More specifically, each carriage is connected to a timing belt (not shown) wrapped around an idle pulley (not shown) and a drive pulley (not shown) which is mounted on the shaft of a stepping motor. The lens 10 is connected to a spiral shaft (not shown) and moved in its optical axis as a stepping motor rotates the spiral shaft, moving the same along the optical axis of the spiral shaft.

The printer 3 comprises, for example, a laser system and an electrophotography system. More precisely, the printer 3 comprises a photosensitive drum 50, an exposure device 52, a development unit 54, a transfer charger 55, a sheet-separating charger 56, a pre-cleaning destaticizer 57, a cleaner 58, a destaticizing lamp 59 and a staticizing charger 61. The photosensitive drum 50 is located, substantially in the middle part of the housing of the digital copying machine 1. The components 52, 54, 55 to 59 and 61 are located around the photosensitive drum 50 in the order they are mentioned.

The photosensitive drum 50 is an image carrier; it can rotate around its axis. The exposure device 52 comprises a laser diode 60, a collimator lens 62, a polygonal mirror 64, a lens 66, reflectors 68 and 70 and a lens 72. The polygonal mirror 64, lens 66 and reflector 68 are located in the optical path of the laser diode 60, in the order they are mentioned. The reflector 70 is provided below the reflector 68, and the lens 72 is positioned beside the reflector 70. In operation, the diode 60 emits a laser beam, which is applied to the collimator lens 62. The lens 62 focuses the beam and applies it to the polygonal mirror 64. The mirror 64 rotates, reflecting the laser beam to the lens 66, which focuses the laser beam. The laser beam is applied to the reflector 68. The reflector 68 reflects and applies the same to the reflector 70. The reflector 70 also reflects and applies the laser beam to the lens 72, which focuses the beam. The laser beam thus focused is applied from the exposure device 52 to the drum 50, thereby forming an electrostatic latent image of the document sheet on the circumferential surface of the drum 50.

The development unit 54 develops the electrostatic latent image formed on the photosensitive drum 50, or converts the image to a visible image. Meanwhile, a sheet-feeding roller 20 and an sheet-aligning roller 25 feed a paper sheet P (i.e., an image recording medium) to the drum 50 from a paper cassette 30 (described later). The paper sheet P is wrapped around the drum 50. The transfer charger 55 transfers the visible image from the drum 50 onto one side of the paper sheet P. The sheet-separating charger 56 achieves AC corona discharge, separating the paper sheet P from the photosensitive drum 50. A sheet-conveying belt (not shown) transports the sheet P to a fixing unit 71. The unit 71 melts the toner defining the visible image, thus fixing the image on the paper sheet P. The data recorded on the document sheet is thereby copied on one side of the paper sheet P. A pair of sheet-discharging rollers 73 supplies the copied sheet P to a unit 74. The unit 74 comprises a tray 74a for receiving discharged sheet P, a pair of rollers 74b for placing each discharged sheet P in a face-down position, and a stapler 74c for stapling a set of copied sheets.

Some of the toner applied to the photosensitive drum 50 remains after the paper sheet P with the visible image transferred to its one side is separated from the drum 50. The residual toner is destaticized the pre-cleaning destaticizer 57 and subsequently cleaned by the cleaner 58. The destaticizing lamp 59 lowers the potential of the drum 50 to a level equal to or less than a predetermined value or less. The data on the document sheet can thereby copied on the next paper sheet P.

To copy data on the other side of the paper sheet P, the sheet P is supplied from the fixing unit 71 through a passage 75a to a tray 75b. The paper sheet O is further supplied through a passage 75c to the transfer charger 55. The charger 55 transfers a visible image from the photosensitive drum 50 onto the other side of the paper sheet P.

A sheet sensor 75d is located below the tray 75b. The sensor 75d emits a light beam to the tray 75b and can receive the beam reflected from any paper sheet P that exists on the tray 75b. Hence, the sheet sensor 75d can determine whether or not a paper sheet P is stacked on the tray 75b.

The passage 75a, tray 75b, passage 75c and sheet sensor 75d constitute an automatic double-side unit 75 which automatically turns over a paper sheet P.

Paper cassettes 30 are provided, one above another, in the housing of the digital copying machine 1. The cassettes 30 can be pulled out from the front of the housing. Each paper cassette 30 comprises a case 31. The case 31 has a sheet-feeding section which is inclined upwards in the direction of feeding paper sheets. Pickup rollers 81 are provided, each at the exit end of the sheet-feeding section of one case 31. Each pickup roller 81 pulls the uppermost of the paper sheets P stacked in the case 31, from the paper cassette 30.

Sheet-feeding units are provided outside the paper cassettes 30, respectively, near the sheet-feeding sections of the cases 31. Each sheet-feeding unit comprises a sheet-feeding roller 84 and a sheet-separating roller 85. The sheet-separating roller 85 may be replaced by a separating pad. The sheet-feeding unit feeds the sheet P from the cassette 30 to the printer 3.

A paper cassette 43 and a large-capacity feeder 47 are attached to the right side of the digital copying machine 1. Both the cassette 43 and the feeder 47 can be removed from the housing of the machine 1. A pickup roller 43a and a sheet-feeding unit are provided at the inner end of the paper cassette 43. The sheet-feeding unit comprises a sheet-feeding roller 43b and a sheet-separating roller 43c. A pickup roller 47a and a sheet-feeding unit are provided at the inner, upper end of the large-capacity feeder 47. This sheet-feeding unit comprises a sheet-feeding roller 47b and a sheet-separating roller 47c.

The paper cassette 43 holds a stack of paper sheets P. The pickup roller 43a can pull the uppermost of the paper sheets P from the paper cassette 43. The sheet P pulled by the pickup roller 43a is fed toward the printer 3 by the sheet-feeding unit comprising the sheet-feeding roller 43b and sheet-separating roller 43c. The large-capacity feeder 47 also holds a stack of paper sheets P. The pickup roller 47a can pull the uppermost of the paper sheets P from the large-capacity feeder 47. The sheet P pulled by the pickup roller 47a is fed toward the printer 3 by a sheet-feeding unit which comprises a sheet-feeding roller 43b and a sheet-separating roller 43c.

Figure 2:
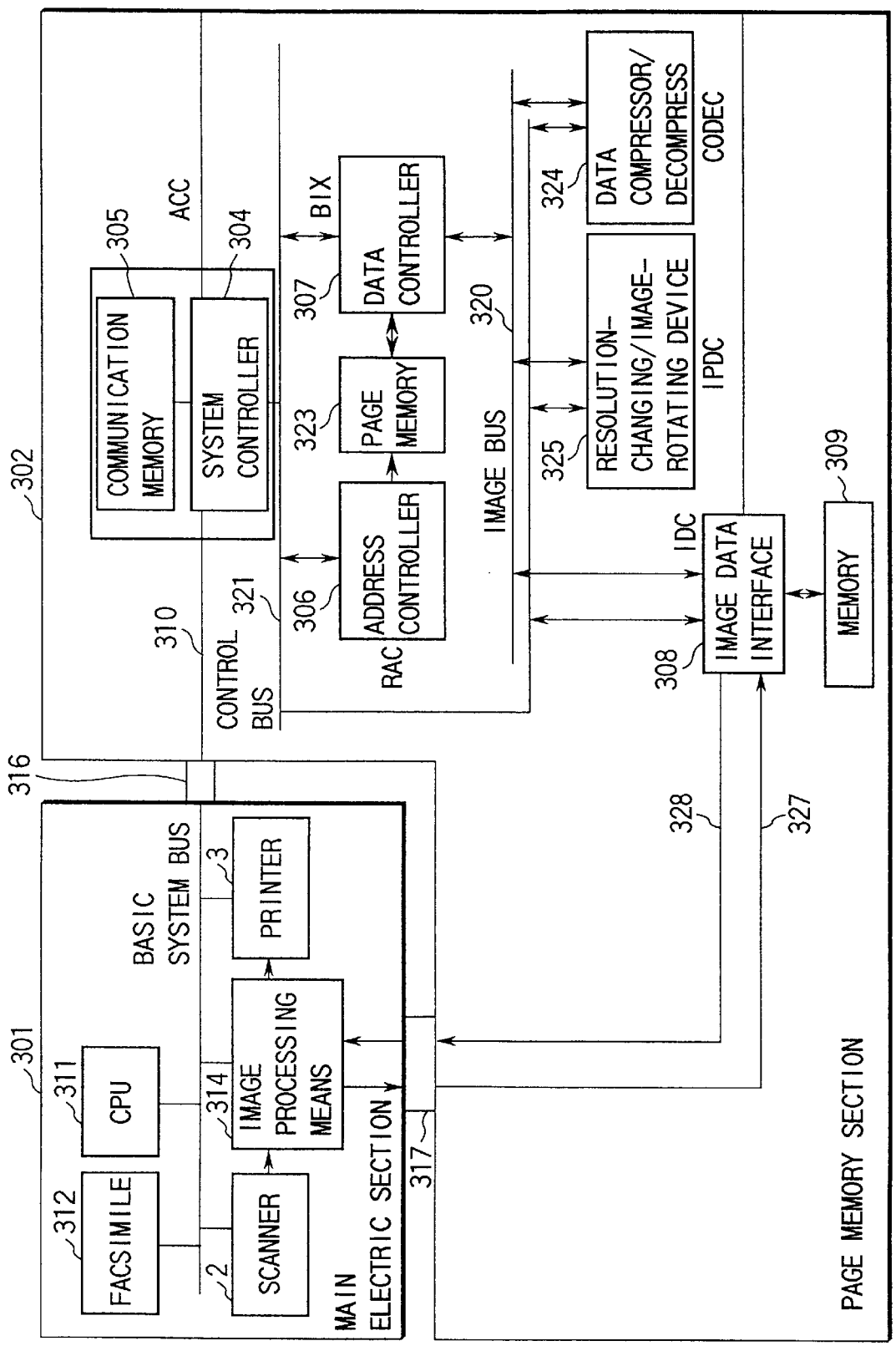
FIG. 2 is a block diagram showing the structure of the image forming apparatus.
Figure 3:
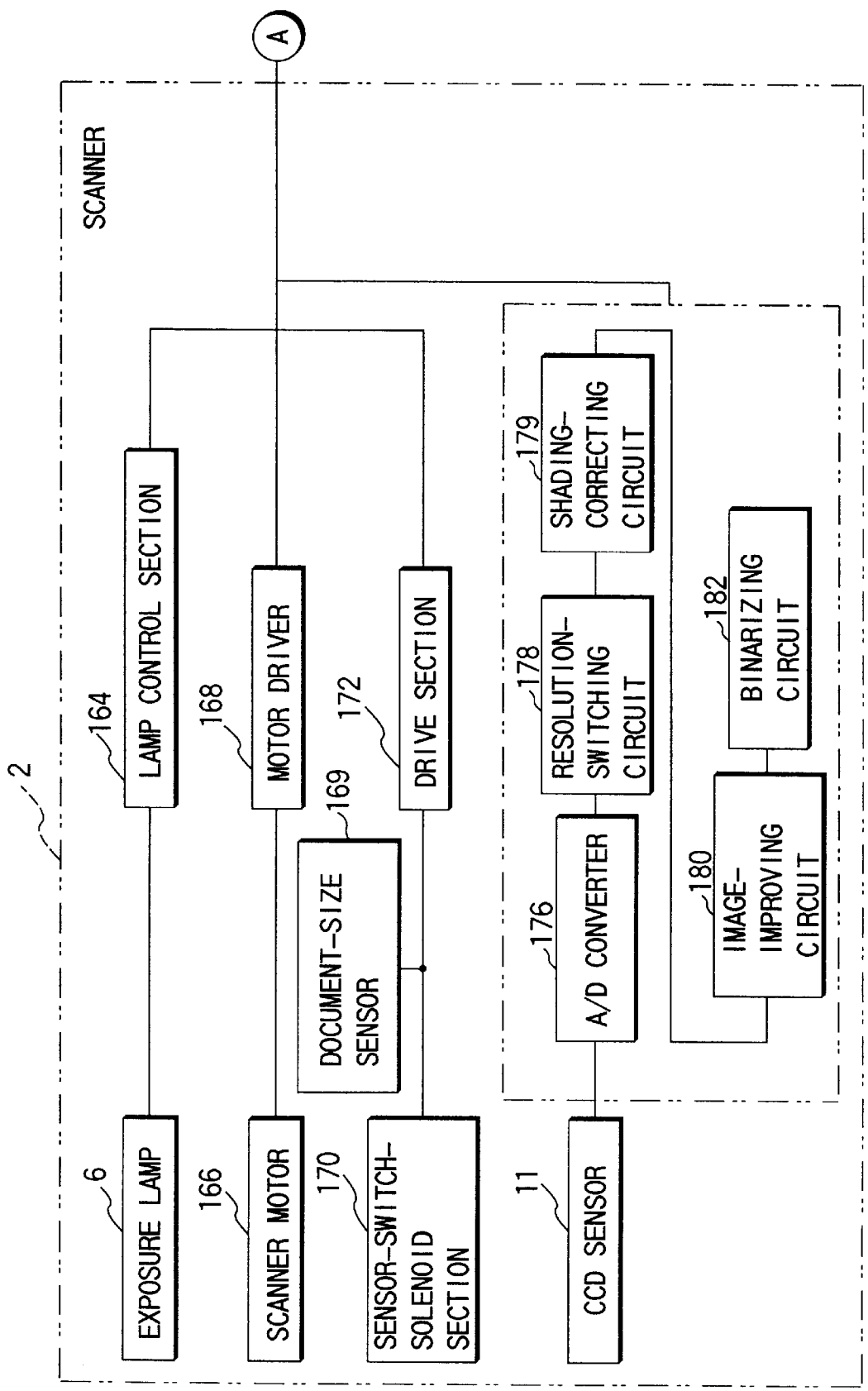
FIG. 3 is a block diagram showing the structure of the scanner incorporated in the image forming apparatus.

The electric components of the digital copying machine 1 will be described, with reference to FIGS. 2 to 6. FIG. 2 shows all electric components of the machine 1. FIG. 3 illustrates the scanner 2, FIG. 4 a main electric section 301, FIG. 5 the printer 3, and FIG. 6 a facsimile (FAX) 312.

As seen from FIG. 2, the digital copying machine 1 comprises tow electric sections, a main electric section 301 and a page memory section 302. The main electric section 301 comprises the scanner 2, the printer 3, a CPU 311, and an image-processing unit 314. The CPU 311 controls the scanner 2, printer 3 and unit 314. The scanner 2 and the printer 3 is connected by the image-processing unit 314. The page memory section 302 is designed to store image data supplied from the section 301, process the image data and transfer it back to the section 301.

The main electric section 301 and the page memory section 302 are connected by a system interface 316 and an image data interface 317. Control data is transferred between the sections 301 and 302 through the system interface 316. Image data is transferred between the sections 301 and 302 through the image data interface 317.

Figure 4:
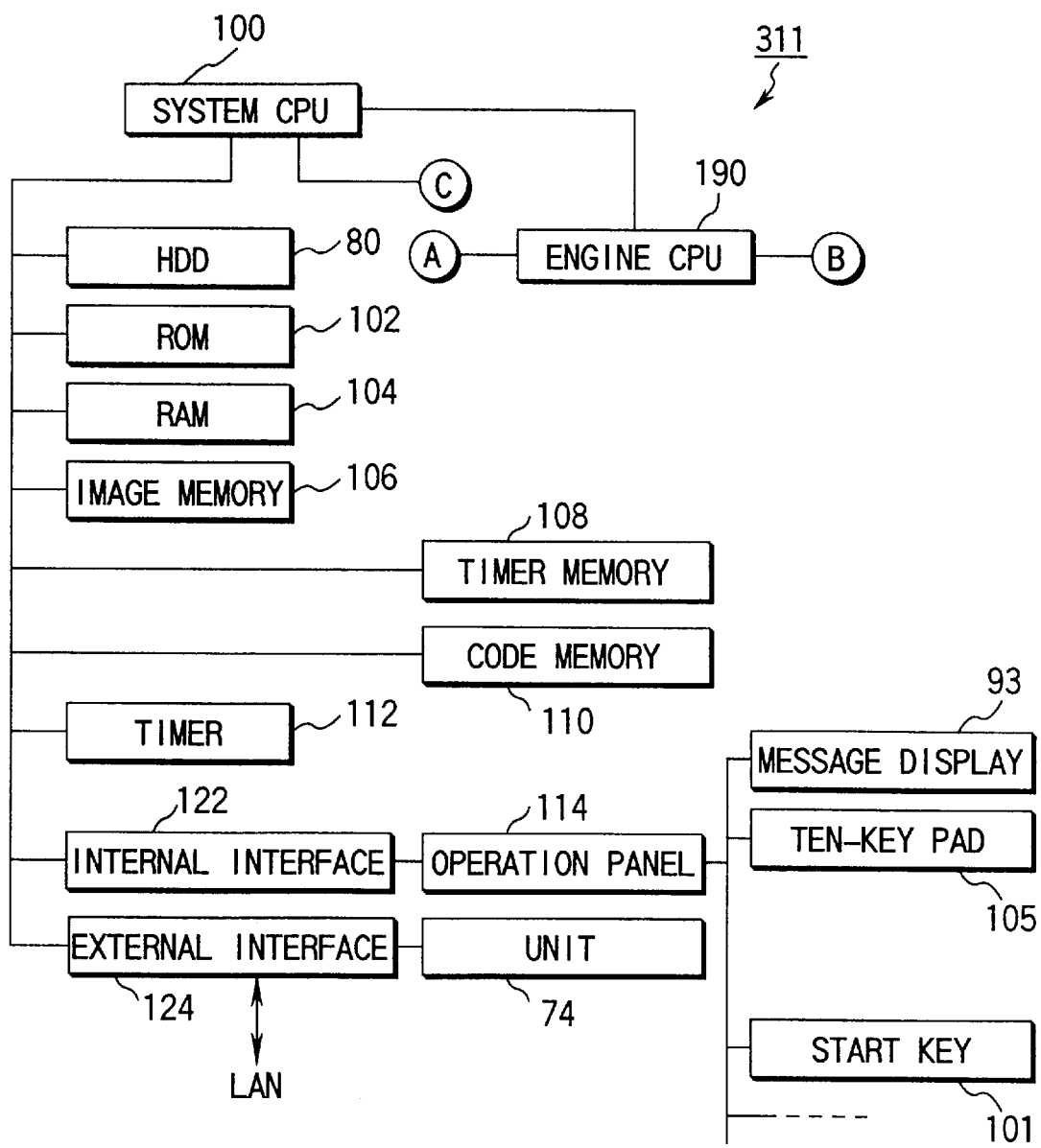
FIG. 4 is a block diagram showing the structure of the principal CPU provided in the image forming apparatus.

As shown in FIG. 4, the CPU 311 comprises a system CPU 100, a hard disk drive (HDD) 80, a ROM 102, a RAM 104, an image memory 106, a timer memory 108, a code memory 110, a timer 112, an internal interface 122 and an external interface 124. The components 80, 102, 104, 106, 108, 110, 112, 122 and 124 are connected to the CPU 100.

The internal interface 122 is connected to an operation panel 114. The external interface 124 is connected to the unit 74. A message display 93, a ten-key pad 105, a start key 101, and the like are mounted on the operation panel 114. An external device (e.g., a personal computer) can be connected to the external interface 124. An engine CPU 190 and a facsimile (FAX) 312 are connected to the system CPU 100. The engine CPU 190 is provided to control the scanner 2 and the printer 3.

The scanner 2 will be described in detail with reference to FIG. 3. As FIG. 3 shows, the scanner 2 comprises the exposure lamp 6, CCD sensor 11, a lamp control section 164, a scanner motor 166, a motor driver 168, a document-size sensor 169, a sensor-switch-solenoid section 170, a drive section 172, an A/D converter 176, and a resolution-switching circuit 178. The scanner 2 further comprises a shading-correcting circuit 179, an image-improving circuit 180, and a binarizing circuit 182.

The lamp control section 164, motor driver 168 and drive section 172 are connected to the engine CPU 190 (FIG. 4) and controlled by the engine CPU 190. The engine CPU 190 is connected to the A/D converter 176 and the circuits 178, 179, 180 and 182, for controlling the converter 176 and the circuits 178, 179, 180 and 182. The lamp control section 164 is designed to control the exposure lamp 6, and the motor driver 168 to control the scanner motor 166. The drive section 172 drives the document-size sensor 169 and the sensors, switches and solenoids included in the section 170. The circuits 178, 179, 180 and 182 cooperate to process the image data supplied from the CCD sensor 11.

Figure 5:
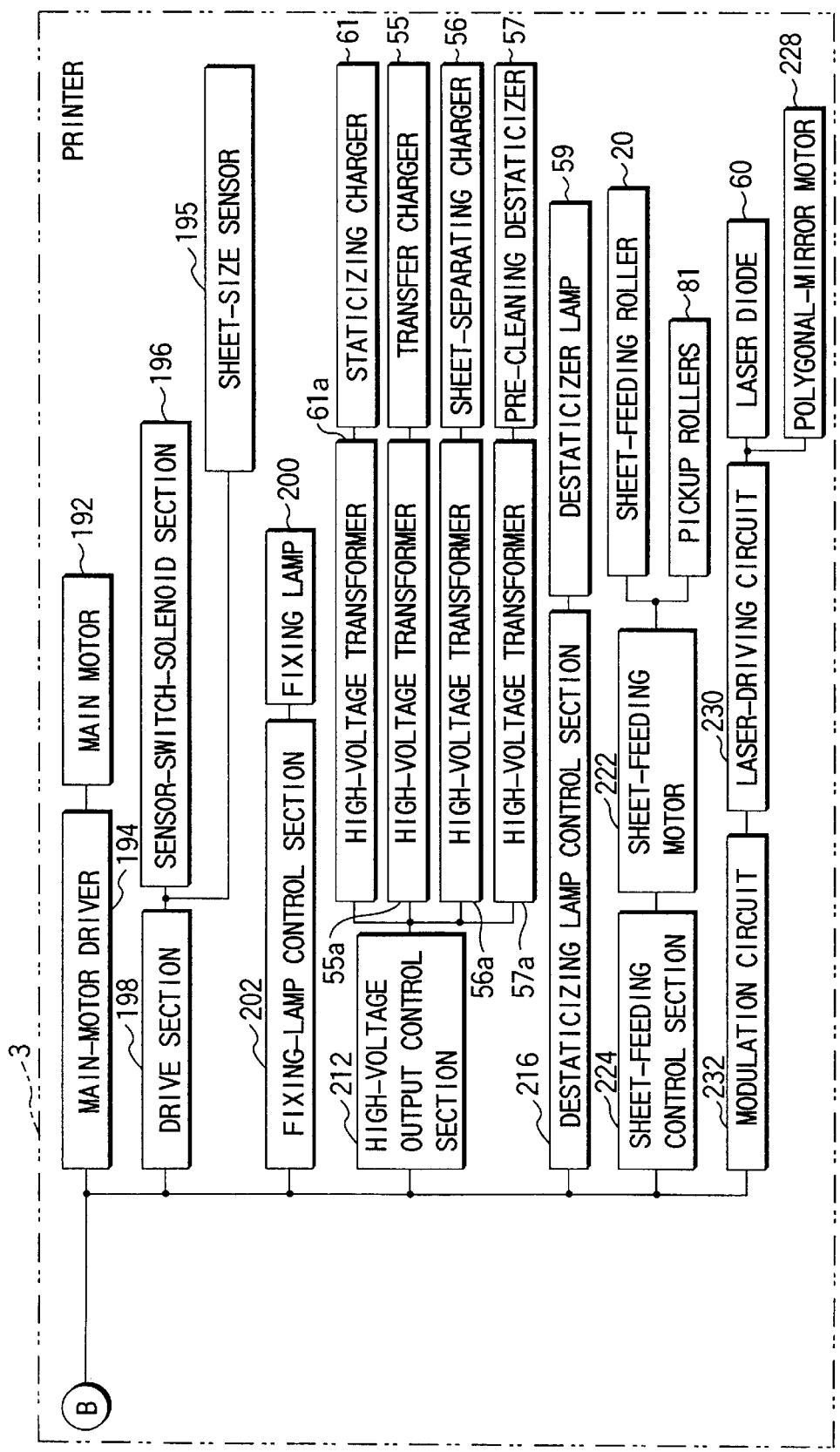
FIG. 5 is a block diagram showing the structure of a printer incorporated in the image forming apparatus.

The printer 3 will be described in detail, with reference to FIG. 5. As FIG. 5 shows, the printer 3 comprises the sheet-feeding roller 20, transfer charger 55, sheet-separating charger 56, pre-cleaning destaticizer 57, destaticizing lamp 59, laser diode 60, staticizing charger 61 and pickup rollers 81—all described above. The printer 3 further comprises high-voltage transformers 55a, 56a, 57a and 61a which are connected to the transfer charger 55, sheet-separating charger 56, pre-cleaning destaticizer 57, and staticizing charger 61, respectively. The printer 3 still further comprises a main motor 192, a main-motor driver 194, a sheet-size sensor 195, a sensor-switch-solenoid section 196, a drive section 198, a fixing lamp 200, a fixing-lamp control section 202, a high-voltage output control section 212, destaticizing lamp control section 216, a sheet-feeding motor 222, a sheet-feeding control section 224, a laser-driving circuit 230, a modulation circuit 232, and a polygonal-mirror motor 228.

The main-motor driver 194, drive section 198, fixing-lamp control section 202, high-voltage output control section 212, destaticizing lamp control section 216, sheet-feeding control section 224 and modulation circuit 232 are connected to the engine CPU 190 and controlled by the CPU 190. The driver 194 drives the main motor 192. The drive section 198 drives the sheet-size sensor 195 and the sensor, switches and solenoids included in the sensor-switch-solenoid section 196. The control section 202 controls the fixing lamp 200. The high-voltage transformers 55a, 56a, 57a and 61a are connected at one end to the transfer charger 55, sheet-separating charger 56, pre-cleaning destaticizer 57, and staticizing charger 61, respectively, and at the other end to the high-voltage output control section 212. The control section 212 controls the high-voltage transformers 55a, 56a, 57a and 61a. The control section 216 controls the destaticizing lamp 59. The control section 224 controls the sheet-feeding motor 222, which drives the sheet-feeding roller 20 and the pickup rollers 81. The modulation circuit 232 controls the laser-driving circuit 230, which drives the laser diode 60 and the polygonal-mirror motor 228.

The page memory section 302 will be described with reference to FIG. 2. As seen from FIG. 2, the page memory section 302 comprises a system controller 304, and address controller 306, a data controller 307, an image data interface (I/F) 308, a memory 309, an image bus 320, a control bus 321, a page memory (PM) 323, a data compressor/decompressor 324, and a resolution-changing/image-rotating device 325. The system controller 304 has a communication memory 305 controls an access to the page memory 323 from the main electric section 301. The page memory 323 is provided for storing image data temporarily. The address controller 306 generates address data for designating any address in the page memory 302. The image bus 320 is provided for transferring data among the data controller 307, image data interface 308, data compressor/decompressor 324, and the device 325. The control bus 321 is provided for transferring control data among the system controller 304, address controller 306 and data controller 307. The data controller 307 controls the transfer of image data through the image bus 320. The image data interface 308 receives image data from, and supplies image data to, the image data interface 317 which connects the page memory section 302 to the main electric section 301. The resolution-changing/image-rotating device 325 changes the resolution of the represented by image data. Therefore, the image data generated by the scanner 2 can be supplied to an external device whose image resolution differs from that of the scanner 2, and the data generated by an external device can be supplied to the printer 3 whose image resolution differs from that of the external device. The device 325 processes binary image data so that the image represented by the data may be rotated by 90°. The data compressor/decompressor 324 compresses image data before the data is transmitted from the facsimile 312 and recorded on a recording media such as an optical disk, and decompresses image data before the image represented by the data is printed. The memory 309 is connected to the image data interface 309. The memory 309 temporarily stores the image data processed by the device 325 and representing an image rotated by either 90° or −90°, before the image data is supplied to the printer 3.

Figure 6:
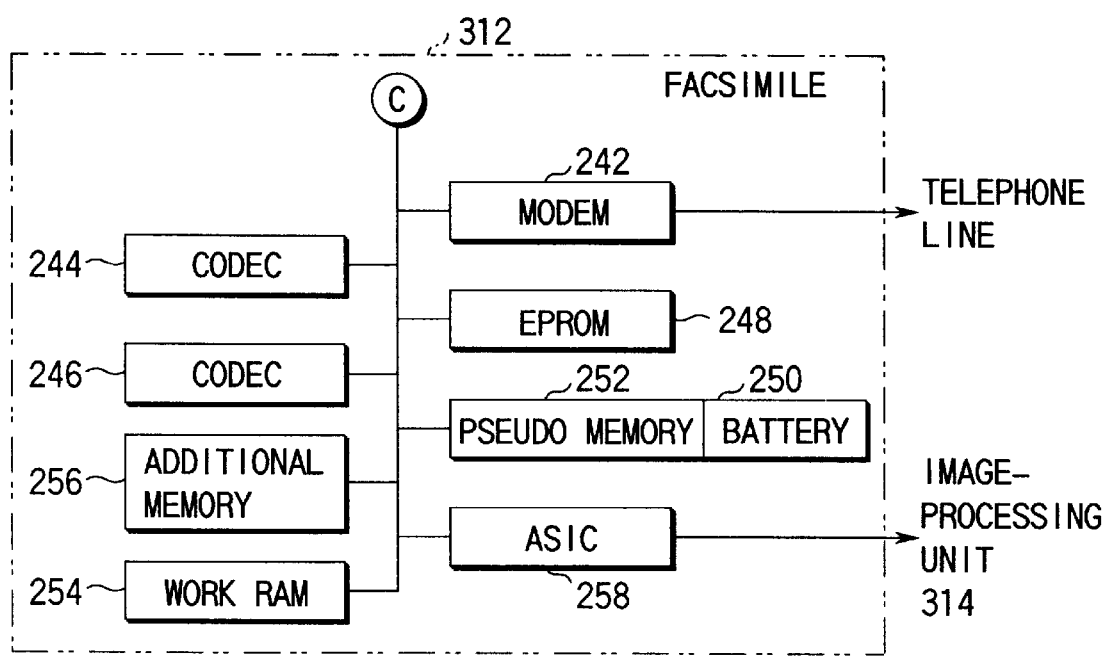
FIG. 6 is a block diagram showing the structure of a facsimile device incorporated in the image forming apparatus.

The facsimile 312 will be described with reference to FIG. 6. The facsimile 312 is connected to a public telephone line. As shown in FIG. 6, the facsimile 312 comprises a modem 242, CODECs 244 and 246, an EPROM 248, a battery 250, a pseudo SRAM 252, a work RAM 254, an additional memory 256, and an ASIC 258. The modem 242 is connected to the telephone line, for modulating and demodulating image data. The CODECs 244 and 246 encode and decode binary image data. The EPROM 248 stores a communication control program. The battery 250 is connected to the pseudo SRAM 252. Supplied with power from the battery 250, the pseudo SRAM 252 can store image data. The work RAM 254 is used, making it possible to process image data in various ways. The additional memory 256 may store the image data overflowing the work RAM. The ASIC 258 is an interface for supplying the image data from the facsimile 312 to the image-processing section 314.

Figure 7:
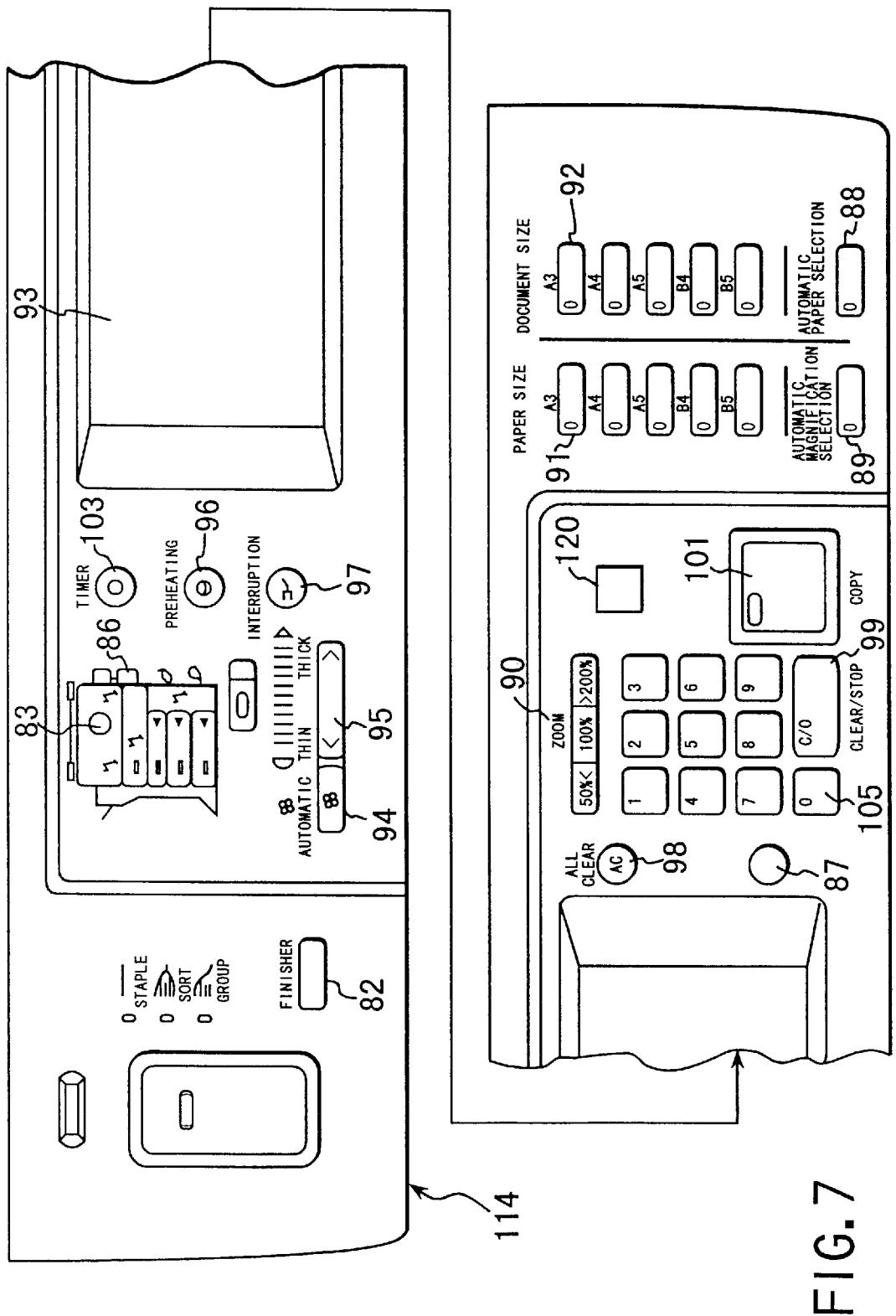
FIG. 7 is a front view of the operation panel of the image-forming apparatus.
Figure 8:
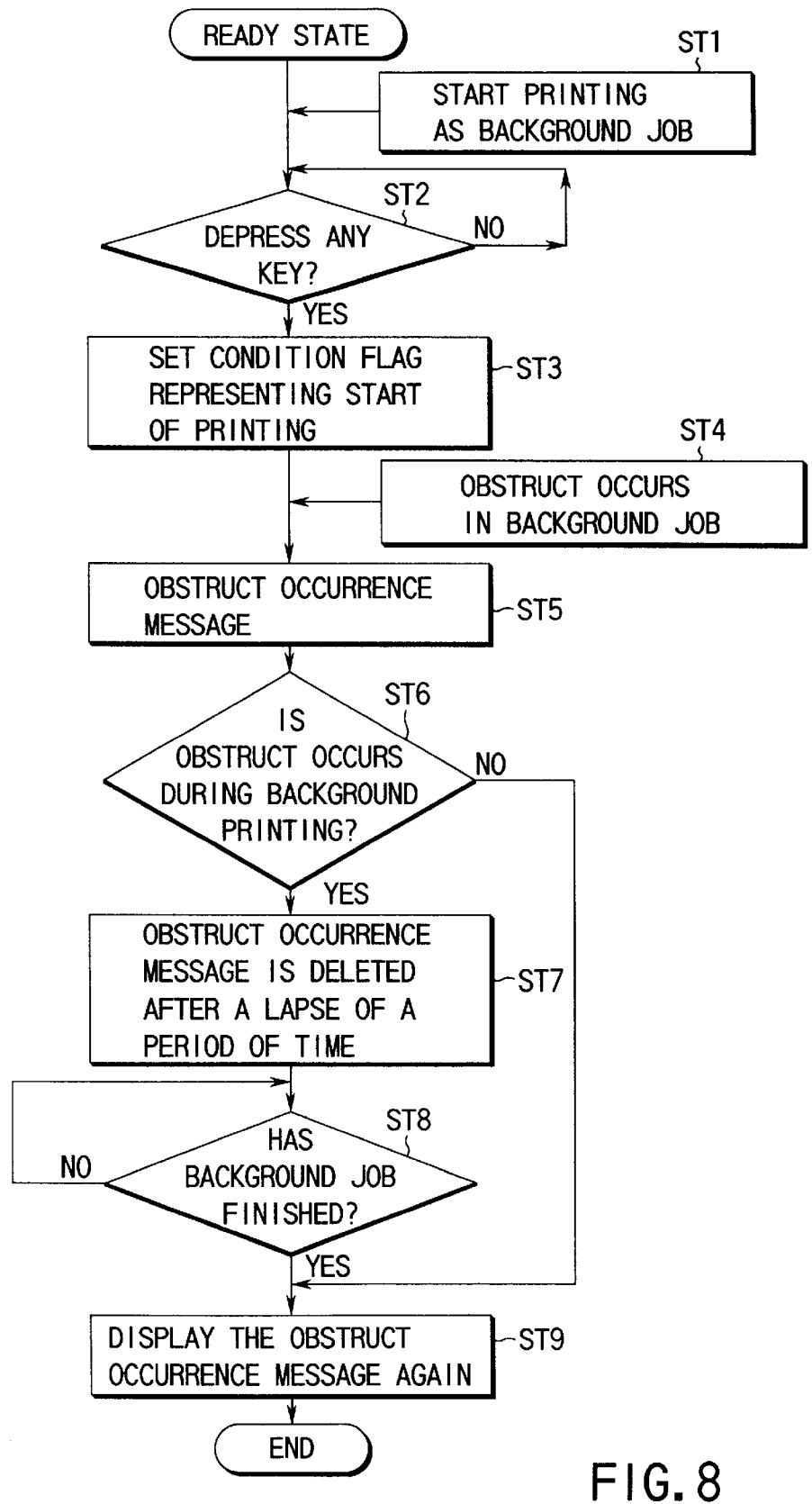
FIG. 8 is a flow chart explaining the operation of the operating system of the image forming apparatus according to the first embodiment.

The operation panel 114 will now be described with reference to FIG. 7. As FIG. 7 shows, the panel 114 has a finish key 82, a operating condition display 83, a cassette-selecting key 86, a help key 87, an automatic sheet-selecting key 88, an automatic magnification-selecting key 89, a zooming/100% key unit 90, document-size keys 91, sheet-size keys 92, a message display 93, an automatic density-selecting key 94, a manual density-selecting key unit 95, a preheating key 96, an interruption key 97, an all-clear key 98, a clear/stop key 99, a start key 101, a timer key 103, a ten-key pad 105, and a function key 120.

The finish key 82 is pushed to set the digital copying machine 1 in sorting mode, grouping mode or stapling mode. The operating condition display 83 displays various icons, indicating the condition in which the copying machine 1 is operating. The cassette-selecting key 86 is depressed when the paper cassette selected is not of a desired size, to select the paper cassette of the desired size. The help key 87 is pushed to display messages on the message display 93, informing the operator of the operation sequence of the copying machine 1. When pushed after the user has set desired functions, the desired functions are displayed on the message display 93.

When the power switch of the copying machine 1 is turned on, the automatic sheet-selecting key 88 sets an automatic sheet-selecting mode when the power switch of the copying machine 1 is turned on. When a document is placed on the document table 5, the size of the document is detected. The sheets of the same size as the document are automatically selected, provided that the copy magnification selected is 100%.

The automatic magnification-selecting key 89 is pushed to select automatic magnification-selecting mode. The operator then pushes one of the sheet-size keys 92, designating sheets of the desired size. Then, an appropriate copy magnification is automatically calculated on the basis of the sheet size designated and the size of the document placed on the table 5.

The zooming/100% key unit 90 is comprised of a "25%<" key, a "100%" key, and a ">800%." When the "25%<" is repeatedly depressed, the copy magnification is decreased to 25%, each time by 1%. Then the ">800%" key is repeatedly depressed, the copy magnification is increased up to 800%, each time by 1%. When the "100%" key is pushed, the copy magnification is set at 100%. The document-size keys 91 are provided for setting the size of the document placed on the table 5. When any one of these keys 91 is pushed, thus setting the size of the document, after sheets of a desired are selected, a proper copy magnification is automatically calculated and set. The sheet-size keys 92 are provided for selecting sheets of various sizes. When any one of sheet-size keys 92 is depressed, the sheets of the size designated by the key 92 depressed are selected.

The message display 93 displays messages and icons, informing the operator of the condition in which the copying machine 1 is operating and also the sequence of operations which the machine 1 is carrying out. The display 93 incorporates a touch panel, which the operator can operate to set desired functions.

When the automatic density-selecting key 94 is depressed, the density of the data printed on the document which is placed on the table 5 is detected, and an optimal copy density is automatically selected. The manual density-selecting key unit 95 is comprised of two keys, i.e., a low-density key and a high-density key. The low-density key is pushed to set any one of five low copy densities. The high-density key is pushed to set five high copy densities.

When depressed, the preheating key 96 turns off all display lamps and set the copying machine 1 in preheating (power-saving) mode. To make copies of a document, the operator pushes the preheating key 96, thereby releasing the machine 1 from the preheating mode.

The interruption key 97 is pushed to interrupt or suspend the copying operation, so that the operator may remove the document from the table 5 and place another document thereon, thereby to copy the other document. The all-clear key 98 is depressed to clear all modes set by the operator, setting the copying machine 1 in the standard copying mode. The clear/stop key 99 is pushed to correct the number of copies preset or to stop the copying operation. The start key 101 is pushed to start the copying operation.

The timer key 103 is depressed, the display 93 displays the time when the power switch of the machine 1 will be turned on or off automatically, provided that a weekly time is set. The ten-key pad 105 is operated to set the number of copies to make. The number of copies can be set at any value ranging from 1 to 999.

The function key 120 is provided to switch the functions of the digital copying machine 1, e.g. facsimile function and printer function.

The object of the present invention is to provide a control system wherein, even if a trouble occurs in the job irrelevant to the user, the job operation being performed in that time can be performed without any problem, when the user starts to operate the machine to execute a new job (the second job) while a job (the first job) operation is being performed, or when a new job (the fourth job) is executed while a job (the third job) operation is being performed.

In the present invention, even if a trouble occurs in a case where a user starts to operate the machine to request a new job (the second job: the front job) while a job (the first job: the background job) is executed, or in the other case where a user starts to operate the machine to request a new job (the fourth job: the front job) while a job (the third job: the background job) is executed, the job operations are not inhibited from being executed. The machine displays the message indicative of the occurrence of the trouble only for a predetermined period of time. When the second or third job is determined to be done, the message indicative of the occurrence of the trouble is displayed again.

A job operation being performed may be obstructed by troubles such as "paper jam", "empty paper box", and "empty toner cartridge". On the other hand, when the trouble such as "service call required" or "front cover opened" occurs, not only the processing executed in that time, all the operation of the machine will be immediately inhibited however the condition is. When at least one of these troubles occur, the system CPU 100 selects one of options, i.e., the continuation, inhibition, or stop of the operation which is being performed in that time.

The "front job" primarily means the operation of the user, or the job required to be executed by the operation of the user. The "background job" does not mean the job required by the direct operation of the user, but is primarily the job required by an external trigger (the data transmitted from the outside, or the like). The data transmission using a memory of a facsimile is a background job since the facsimile 312 in the digital copying machine 1 determines to transmit the data transmission.

The operation of the control system according to the first embodiment in the digital copying machine 1 as described above will be described below with reference to flow-charts.

At first, a printing according to the background job is started in a ready state (ST 1), and the system CPU 100 sets a condition flag indicative of the start of the job (front job) during the printing as the background job when any one of keys (other than the a start key 101) of the operation panel 114 is depressed (ST 2). In this embodiment, facsimile data transmission is executed as a front job.

Figure 9A:
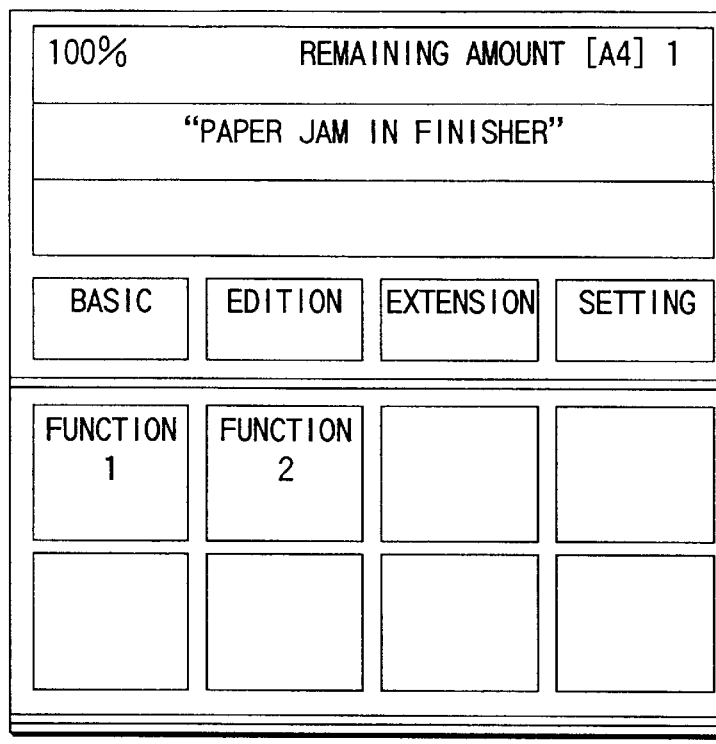
FIG. 9A shows an example of a message displayed by a message indicator.
Figure 9B:
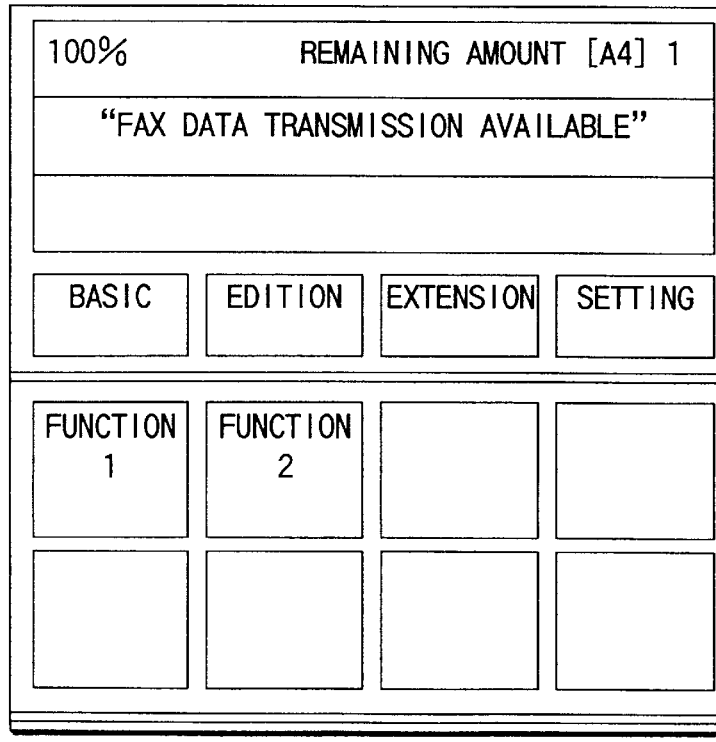
FIG. 9B shows an example of a message displayed by a message indicator.

In the background job started in step S1, a trouble "paper jam in finisher" occurs (ST 4), the system CPU 100 instructs a message indicator 93 on the operation panel 114 to display as "PAPER JAM IN FINISHER" (ST 5), as shown in FIG. 9A. In this time, the condition flag representing that the background printing is being performed is set, and the CPU determines that the trouble occurs during the background printing is being performed (ST 6). After a lapse of a period of time, e.g. three seconds, the trouble occurrence message is deleted and a message "FACSIMILE DATA TRANSMISSION AVAILABLE" is displayed as shown in FIG. 9B. The background operation is continuously performed without interruption (ST 7).

Figure 10:
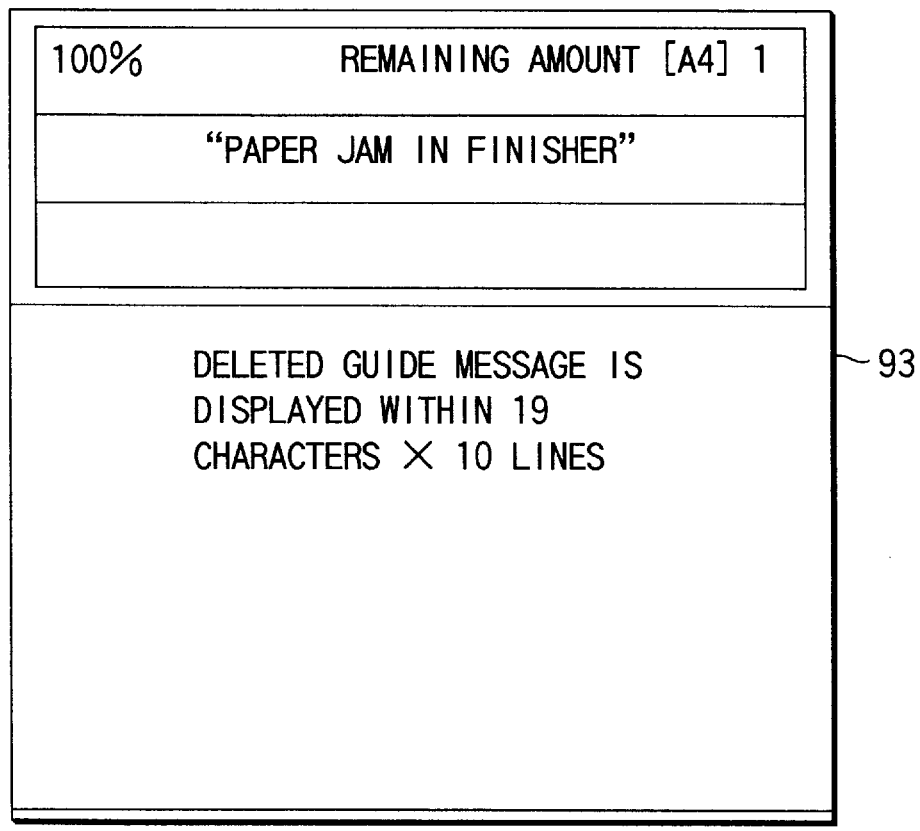
FIG. 10 shows an example of a message displayed by a message indicator.

When the operation has finished (ST 8), the system CPU 100 instructs the message indicator 93 to display the trouble in the background job which occurred in ST 4, as "PAPER JAM IN FINISHER" again (ST 9), as shown in FIG. 10.

The finishing of the operation is determined by the system CPU 100 in response to the depressing of the start key 101 by which a front job is instructed to be executed, or when no operation is performed for a predetermined period of time has passed.

Figure 11:
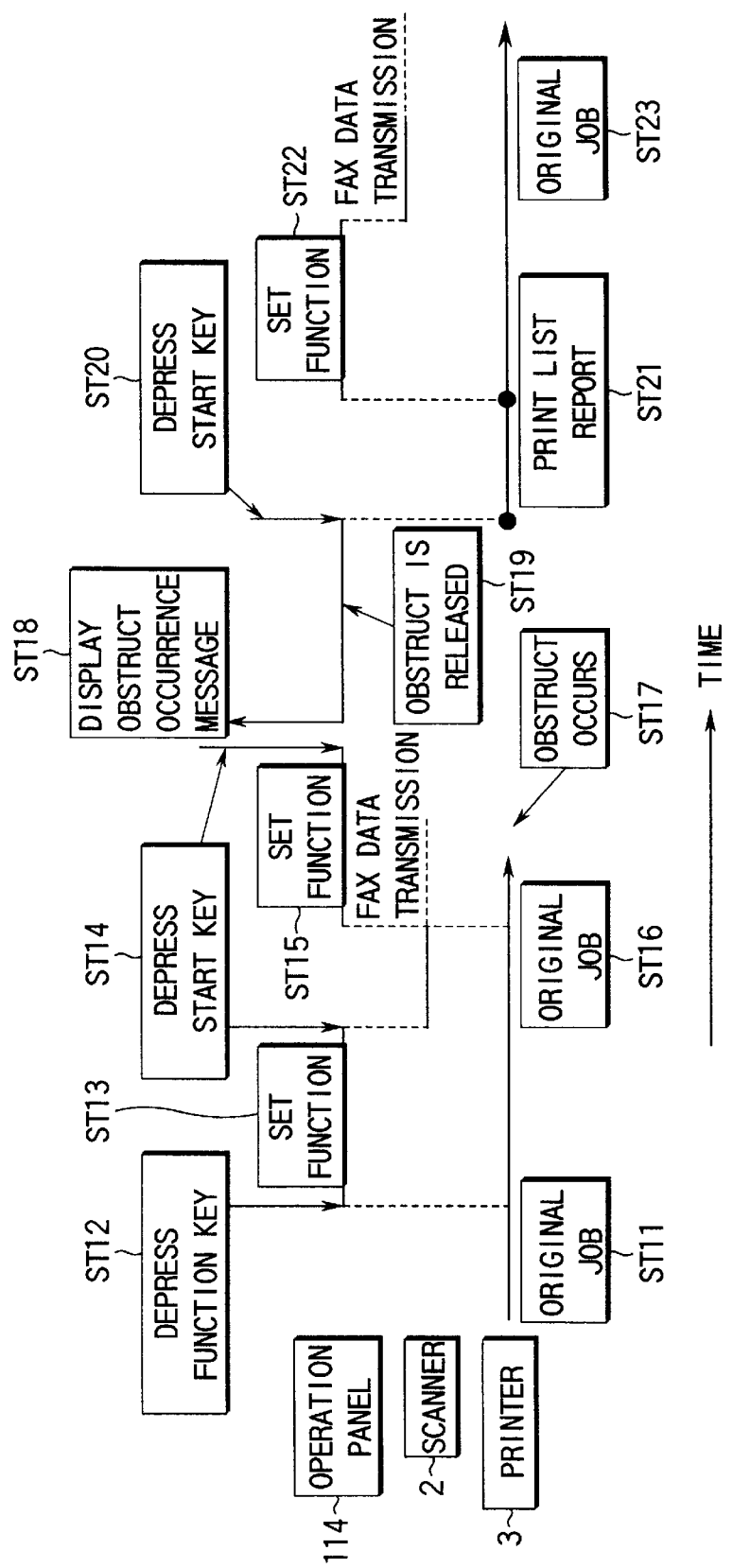
FIG. 11 is a timing chart representing the operation when a problem occurs.
Figure 12:
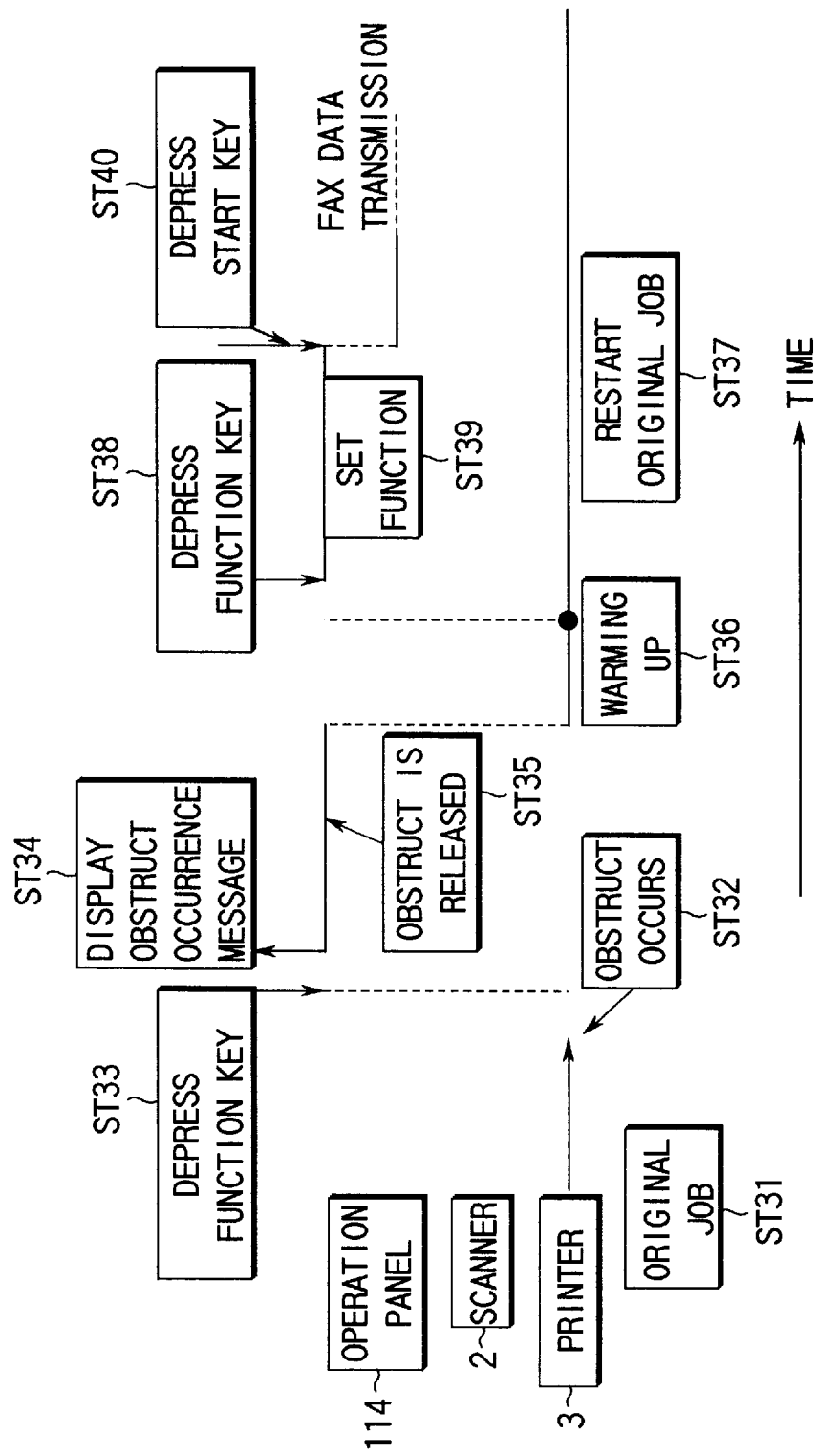
FIG. 12 is a timing chart representing the operation when a problem occurs.

Next, an example of the operation when a trouble occurs during the background job operation while a front job is set will be described below with reference to the timing chart shown in FIG. 11.

The system CPU 100 sets a condition flag representing the start of the operation (front job) upon the depression of the function key 120 of the operation panel while the background job (original job) operation is performed in the printer 3 (ST 11), and the function of the front job is set using the operation panel 114 (ST 13). The function set in this time is facsimile data transmission.

After the front job function setting operation has finished and the start key 101 is depressed (ST 14), an image data is read by a scanner 2 and the facsimile data transmission is started.

Subsequently, when some trouble in the original (background) job operation occurs (ST 17) while the front job function setting operation is being performed (ST 15), the system CPU 100 instructs the message indicator 93 of the operation panel 114 to display the trouble occurrence message for about three seconds, and when three seconds have passed, instructs to delete the trouble occurrence message so that the front job operation can be continued without interruption.

In this time, all the operations can be continued without interruption, but only job start is inhibited from being executed. Upon the depression of the start key 101, the system CPU 100 determines that the operation has finished and instructs the message indicator 93 of the operation panel 114 to display the trouble occurrence message again (TROUBLE OCCURENCE MESSAGE: ST 18). When the trouble is overcome, the system CPU 100 determines that any job can start (ST 19).

Further, if the front cover (in the present embodiment, an automatic paper feeding apparatus 4 is provided) is opened, all the operations are immediately stopped. This is to protect the user from the danger which may be generated during the trouble removing operation. In other words, the operation can be continued till the front cover is opened.

When the trouble is overcome and the start key 101 is depressed (ST 21), the printer 3 prints a list report (ST 21).

After the report printing operation has finished, the front job (facsimile data transmission) function can be set using the operation panel 114 (ST 22), and the scanner 2 reads the data, and the facsimile transmits the data. After the printing of the list report, the printer 3 executes the background (original) job since the trouble is released (ST 23).

Next, an example of the operation when some trouble occurs in the background job immediately before the operation of the front job will be described below.

When some trouble occurs in the background job (ST 32) while the printer 3 performs the background (original) job operation (ST 31), a new operation (setting) cannot be performed till the trouble is overcome, except for the case where the trouble of "empty toner cartridge" occurs.

In this time, any operation cannot be performed even if the function key 120 of the operation panel 114 is depressed (ST 33), and the message indicator 93 on the operation panel 114 displays the trouble occurrence message (TROUBLE OCCURENCE MESSAGE: ST 34).

After the trouble is overcome (ST 35), the printer 3 executes the background (original) job again (ST 37) when the warming-up (W. UP) has finished (ST 36).

After the warming-up (W. UP) has finished, the system CPU 100 sets a condition flag representing the start of the operation (front job) by depressing the function key 120 on the operation panel 114, and the front job function is set using the operation panel 114 (ST 39).

Upon depressing the start key 101 (ST 40) after the front job function is determined, the scanner 2 reads the image data and the read data is transmitted by the facsimile.

Figure 13:
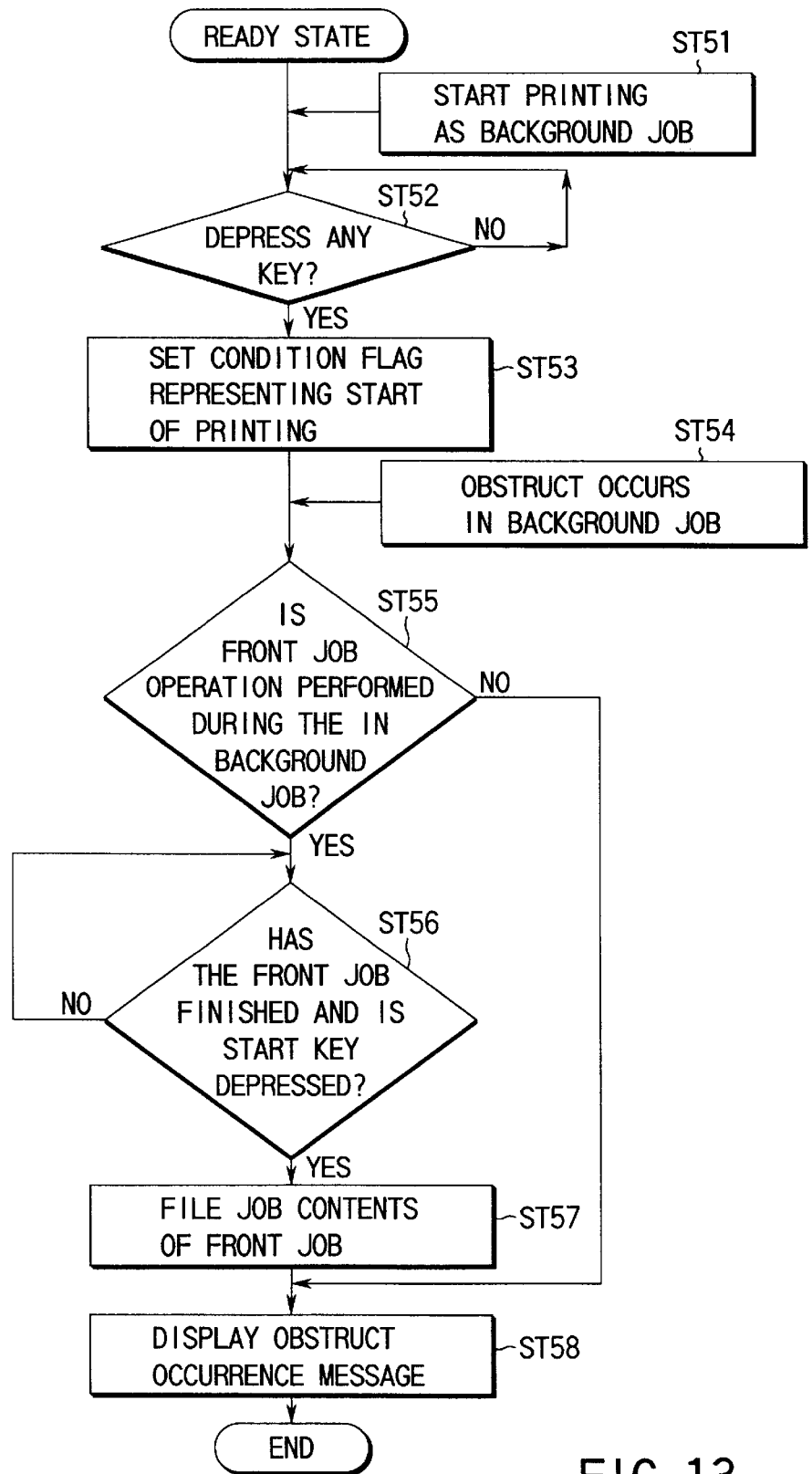
FIG. 13 is a flow chart explaining the operation when a problem occurs.

The following is the description of the operation of the control system in the digital copying machine 1 according to the second embodiment of the present invention in conjunction with the flow-chart shown in FIG. 13.

At the ready state, the printing according to the background job starts (ST 51). When any one of keys (other than the start key 101) on the operation panel 114 is depressed (ST 52), the system CPU 100 sets a condition flag indicative of the start of the operation (front job) during the background printing operation (ST 53). In this embodiment, the facsimile data transmission is executed as a front job.

When the trouble "PAPER JAM IN FINISHER" occurs (ST 54) in the background job started in ST 51, the system CPU 100 determines that the front job operation is performed during the background printing since the condition flag has been set in ST 53, and lets the front job operation continue (ST 55).

The system CPU 100 stores the contents of the front job operation in a RAM 104 (ST 57) when the start key 101 is depressed (ST 56) after the operation of the front job has finished.

After ST 57 has finished, the system CPU 100 instructs the message indicator 93 to display the message of the occurrence of the trouble for the background job occurred in ST 54, i.e., "PAPER JAM IN FINISHER" (ST 58), as shown in FIG. 10.

Figure 14:
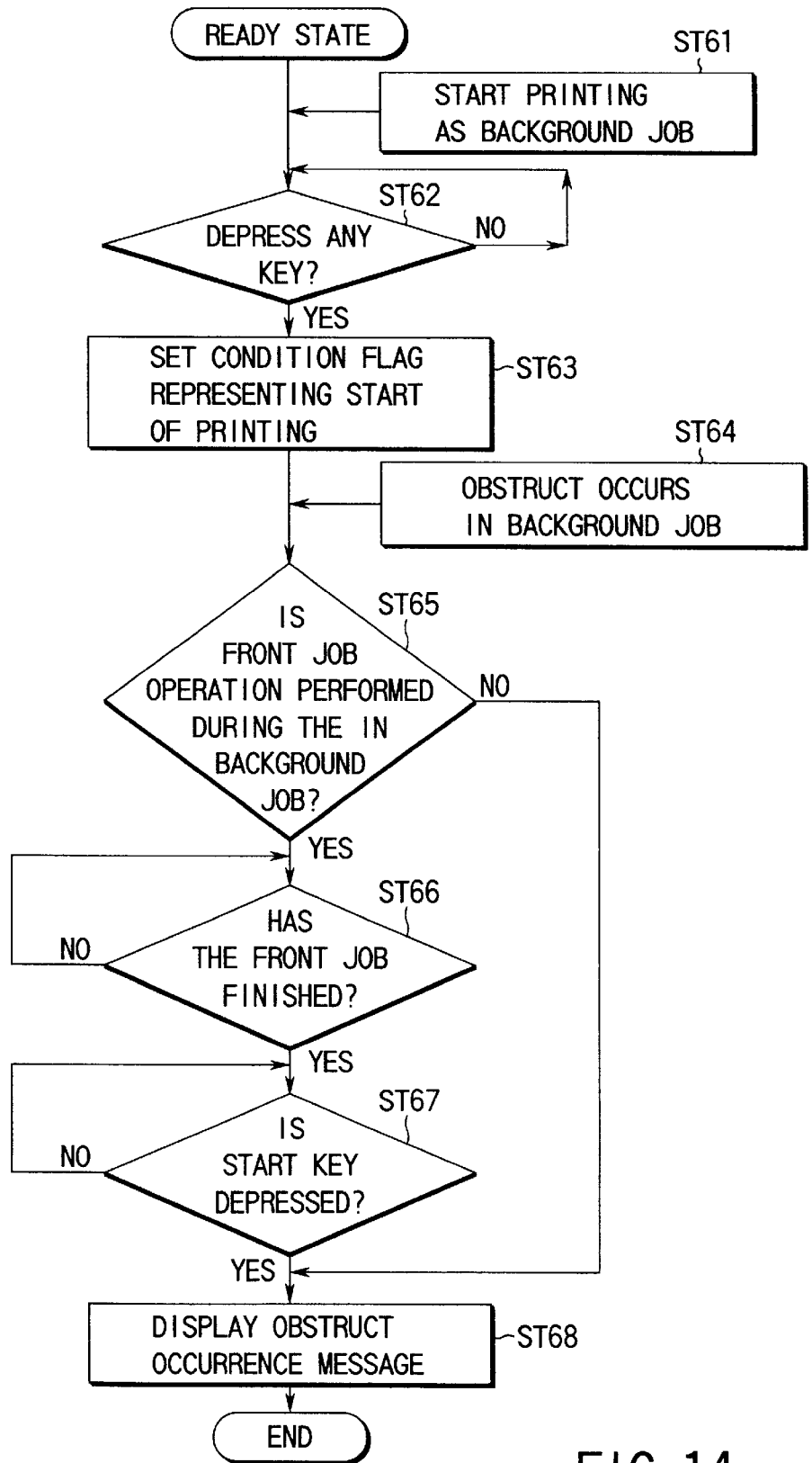
FIG. 14 is a flow chart explaining the operation when a problem occurs.

Next, an example of the operation of the control system of the digital copying machine according to the third embodiment of the present invention will be described below with reference to the flow-chart of FIG. 14.

At the ready state, the printing according to the background job starts (ST 61). When any one of keys (other than the start key 101) on the operation panel 114 is depressed (ST 62), the system CPU 100 sets a condition flag indicative of the start of the operation (front job) during the background printing (ST 63). In this embodiment, the facsimile data transmission is set as a front job.

When the trouble "PAPER JAM IN FINISHER" occurs (ST 64) in the background job started in ST 61, the system CPU 100 determines that the front job operation is performed during the background printing since the condition flag has been set in ST 63, and lets the front job operation continue (ST 65).

The system CPU 100 instructs the message indicator 93 to display the message of the occurrence of the trouble for the background job occurred in ST 54, i.e., "PAPAER JAM IN FINISHER" (ST 68), as shown in FIG. 10 when the start key 101 is depressed (ST 67) after the operation of the front job has finished (ST 66). In this time, in order to prevent the operator from misunderstanding that the trouble occurred due to the operator's own job, the indicator may display that the trouble occurs due to the background job.

As described above, according to the above-mentioned embodiments of the present invention, even if the trouble occurs due to the background job, the operation can be smoothly continued without interrupting the front job operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. An image forming apparatus comprising:

means for receiving image data;

means for storing image data received by the receiving means;

means for forming image on an image-forming medium on the basis of the image data stored in the storing means;

means for setting a second job while the image-forming means is performing an operation of a first job;

means for displaying a trouble occurrence message when a trouble occurs in the first job operation;

first control means for controlling the display means to delete the trouble occurrence message after a lapse of a predetermined period of time unless the setting means has set the second job when the display means display the trouble occurrence message; and second control means for controlling the display means to display the trouble occurrence message again when the setting means has set the second job.

2. An apparatus according to claim 1, wherein the setting means sets a flag representing that the setting of the second job is started during the first job operation.

3. An apparatus according to claim 1, wherein the second job setting is determined to finish by detecting that a setting of start of the second job operation is performed.

4. An apparatus according to claim 1, wherein the second job setting is determined to finish by detecting that a setting operation is performed during a preset period of time.

5. An apparatus according to claim 1, wherein the predetermined period of time, during which the display means to display the trouble occurrence message is adjustable.

6. An apparatus according to claim 1, wherein the first control means includes detecting means for detecting the trouble in the first job operation and a first display-control means for controlling the display means to display a message indicative of the trouble detected by the detecting means only for the predetermined period of time.

7. An apparatus according to claim 1, wherein the second control means includes determining means for determining that the setting means has finished the setting of the second job, and a second display-control means for controlling the display means to display a message indicative of a trouble in the first job operation.

8. An image forming apparatus comprising:

means for receiving image data;

first memory means for storing image data received by the receiving means;

means for forming image on an image-forming medium on the basis of the image data stored in the memory means;

means for setting a second job while the image-forming means is performing an operation of a first job;

means for controlling the setting means to continue the setting of the second job until the setting means completes the setting operation for the second job when a trouble occurs in the first job operation;

second memory means for storing the second job when the setting of the second job which is continued by the setting means has completed; and means for displaying a trouble occurrence message representing that the trouble occurs in the first job operation by the image-forming means when the second job is stored in the second memory means.

9. An apparatus according to claim 8, wherein the control means includes detecting means for detecting the trouble in the first job operation, determining means for determining that the setting means has completed the setting of the second job, and setting-continuing means for control the setting means to continue the setting of the second job when the determining means determines that the setting means is executing the setting of the second job.

10. An image forming apparatus comprising:

means for receiving image data;

means for storing image data received by the receiving means;

means for forming image on an image-forming medium on the basis of the image data stored in the storing means;

means for setting a second job while the image-forming means is performing an operation of a first job;

means for controlling the setting means to continue the setting of the second job until the setting means completes the setting operation for the second job when a trouble occurs in the first job operation; and means for displaying a trouble occurrence message representing that the trouble occurs in the first job operation by the image-forming means when the second job setting has completed by the setting means.

11. An image forming apparatus comprising:

means for receiving image data;

means for storing image data received by the receiving means;

means for forming image on an image-forming medium on the basis of the image data stored in the storing means;

means for setting a second job while the image-forming means is performing an operation of a first job;

means for displaying a contents of a job set by the setting means and development of the first job by the image-forming means;

means, when a trouble occurs in the first job by the image-forming means during the setting of the second job by the setting means, for selecting either of continuing and stopping of the setting of the second job, in accordance with a kind of the trouble;

first control means, when the selecting means selects the continuing of the setting of the second job, for controlling the display means to display a trouble occurrence message representing that the trouble occurs in the first job operation by the image-forming means, and for controlling the setting means to continue the setting of the second job; and second control means for controlling the display means to display the trouble occurrence message again when the setting means has set the second job.

12. An apparatus according to claim 11, wherein the selecting means includes recognition means for recognizing that the setting means is setting the second job, and determining means for determining in accordance with a kind of the trouble in the first job whether or not the setting means can set a job when a trouble occurs in the first job while the recognition means recognizes that the setting means is setting the second job.

13. An image forming apparatus comprising:

means for receiving image data;

means for storing image data received by the receiving means;

means for forming image on an image-forming medium on the basis of the image data stored in the storing means;

means for setting a front job while the image-forming means is executing an operation of a background job;

means for displaying a trouble occurrence message when a trouble occurs in the background job operation;

first control means for controlling the display means to display the trouble occurrence message for a predetermined period of time until the setting means completes the setting operation for the front job when the display means display the trouble occurrence message; and second control means for controlling the display means to display the trouble occurrence again when the setting means has set the front job.

14. An apparatus according to claim 11, wherein the background job is instructed to operate by an external trigger, the front job is set by the setting means.

* * * * *

UNITED STATES PATENT AND TRADEMARK OFFICE
CERTIFICATE OF CORRECTION

PATENT NO. : 5,832,338
DATED : November 3, 1998
INVENTOR(S) : Masato KUGA

It is certified that error appears in the above-identified patent and that said Letters Patent is hereby corrected as shown below:

On the title page, Item [30] Foreign Application Priority Data was omitted please insert the following:

--November 28, 1996, Japan, 8-317805--
--November 13, 1997, Japan, 9-312339--

Signed and Sealed this

First Day of June, 1999

Attest:

Q. TODD DICKINSON

*Attesting Officer*     *Acting Commissioner of Patents and Trademarks*